United States Patent
Weber et al.

(10) Patent No.: US 8,197,715 B2
(45) Date of Patent: Jun. 12, 2012

(54) THERMOPLASTIC MOULDING COMPOSITIONS HAVING IMPROVED DUCTILITY

(75) Inventors: Martin Weber, Maikammer (DE);
Xaver Hopfenspirger, Haßloch (DE);
Steffen Funkhauser, Viernheim (DE);
Walter Heckmann, Weinheim (DE);
Jörg Schnorr, Ludwigshafen (DE);
Raquel Fernandez Rodiles, Mannheim (DE); Rainer Klenz, Haßloch (DE);
Hagen Stawitzki, Karlsruhe (DE);
Bernd Bruchmann, Freinsheim (DE)

(73) Assignee: BASE SE, Ludwigshafen (DE)

( * ) Notice: Subject to any disclaimer, the term of this patent is extended or adjusted under 35 U.S.C. 154(b) by 435 days.

(21) Appl. No.: 12/519,674

(22) PCT Filed: Dec. 11, 2007

(86) PCT No.: PCT/EP2007/063662
§ 371 (c)(1),
(2), (4) Date: Jun. 17, 2009

(87) PCT Pub. No.: WO2008/074687
PCT Pub. Date: Jun. 26, 2008

(65) Prior Publication Data
US 2010/0090174 A1    Apr. 15, 2010

(30) Foreign Application Priority Data
Dec. 19, 2006   (EP) ..................................... 06126514

(51) Int. Cl.
H01B 1/06 (2006.01)
A61K 9/16 (2006.01)
C08L 31/00 (2006.01)
C08L 27/00 (2006.01)

(52) U.S. Cl. ......... 252/511; 524/543; 524/556; 524/567

(58) Field of Classification Search ....... 252/500–521.6, 252/511; 524/495, 607, 543, 556, 567
See application file for complete search history.

(56) References Cited

U.S. PATENT DOCUMENTS

| | | | |
|---|---|---|---|
| 4,537,949 A | 8/1985 | Schmidt et al. | |
| 4,540,772 A | 9/1985 | Pipper et al. | |
| 5,081,222 A | 1/1992 | Reimann et al. | |
| 5,218,082 A | 6/1993 | Reimann et al. | |
| 5,252,661 A | 10/1993 | Reimann et al. | |
| 5,272,236 A | 12/1993 | Lai et al. | |
| 5,298,595 A | 3/1994 | Reimann et al. | |
| 6,646,100 B2 | 11/2003 | Hofmann et al. | |
| 6,660,796 B2 * | 12/2003 | Schueler et al. | 524/495 |
| 6,844,061 B2 | 1/2005 | Morita et al. | |
| 7,081,509 B2 | 7/2006 | Wagner et al. | |
| 2004/0144963 A1 | 7/2004 | Braig et al. | |
| 2004/0167264 A1 | 8/2004 | Vathauer et al. | |
| 2004/0235999 A1 | 11/2004 | Vathauer et al. | |
| 2008/0015303 A1 | 1/2008 | Eibeck et al. | |
| 2009/0118417 A1 * | 5/2009 | Tachikawa et al. | 524/539 |

FOREIGN PATENT DOCUMENTS

| | | |
|---|---|---|
| CA | 963594 | 2/1975 |
| DE | 10138216 A1 | 2/2003 |
| DE | 10149152 A1 | 4/2003 |
| DE | 10163163 A1 | 7/2003 |
| EP | 0129195 A2 | 12/1984 |
| EP | 0129196 A2 | 12/1984 |
| EP | 0299444 A2 | 1/1989 |
| EP | 0205556 B1 | 5/1995 |
| EP | 0270666 B1 | 8/1996 |
| EP | 0969128 B1 | 11/2003 |
| WO | WO-2004048452 A1 | 6/2004 |
| WO | WO-2004056919 A1 | 7/2004 |
| WO | WO-2006042705 A1 | 4/2006 |
| WO | WO 2007116818 A1 * | 10/2007 |

* cited by examiner

*Primary Examiner* — Mark Kopec
*Assistant Examiner* — Jaison Thomas
(74) *Attorney, Agent, or Firm* — Connolly Bove Lodge & Hutz LLP

(57) ABSTRACT

Thermoplastic molding compositions comprising
A) from 40 to 96% by weight of a semiaromatic polyamide,
B) from 2 to 30% by weight of a copolymer composed of
  $B_1$) from 35 to 89.9% by weight of ethylene,
  $B_2$) from 10 to 60% by weight of 1-octene or 1-butene or propylene or a mixture of these, and
  $B_3$) from 0.05 to 5% by weight of functional monomers, where the functional monomers have been selected from the group of the carboxylic acid groups, carboxylic anhydride groups, carboxylic ester groups, carboxamide groups, carboximide groups, amino groups, hydroxy groups, epoxy groups, urethane groups, or oxazoline groups, or a mixture of these,
C) from 1 to 50% by weight of fibrous or particulate fillers, or a mixture of these,
D) from 0.1 to 10% by weight of
  $D_1$) at least one highly branched or hyperbranched polycarbonate with an OH number of from 1 to 600 mg KOH/g of polycarbonate (to DIN 53240, part 2), or
  $D_2$) at least one highly branched or hyperbranched polyester of $A_xB_y$ type, where x is at least 1.1 and y is at least 2.1,
  or a mixture of these,
E) from 0 to 15% by weight of an electrically conductive additive,
F) from 0 to 30% by weight of further additives,
where the total of the percentages by weight of components A) to F) is 100%.

18 Claims, No Drawings

THERMOPLASTIC MOULDING COMPOSITIONS HAVING IMPROVED DUCTILITY

CROSS-REFERENCE TO RELATED APPLICATIONS

This application is a national stage application (under 35 U.S.C. §371) of PCT/EP2007/063622, filed Dec. 11, 2007, which claims benefit of European application 06126514.6, filed Dec. 19, 2006.

BACKGROUND OF THE INVENTION

The present invention relates to thermoplastic molding compositions comprising
A) from 40 to 96% by weight of a semiaromatic polyamide,
B) from 2 to 30% by weight of a copolymer composed of
  $B_1$) from 35 to 89.9% by weight of ethylene,
  $B_2$) from 10 to 60% by weight of 1-octene or 1-butene or propylene or a mixture of these, and
  $B_3$) from 0.05 to 5% by weight of functional monomers, where the functional monomers have been selected from the group of the carboxylic acid groups, carboxylic anhydride groups, carboxylic ester groups, carboxamide groups, carboximide groups, amino groups, hydroxy groups, epoxy groups, urethane groups, or oxazoline groups, or a mixture of these,
C) from 1 to 50% by weight of fibrous or particulate fillers, or a mixture of these,
D) from 0.1 to 10% by weight of
  $D_1$) at least one highly branched or hyperbranched polycarbonate with an OH number of from 1 to 600 mg KOH/g of polycarbonate (to DIN 53240, part 2), or
  $D_2$) at least one highly branched or hyperbranched polyester of $A_xB_y$ type, where x is at least 1.1 and y is at least 2.1,
  or a mixture of these,
E) from 0 to 15% by weight of an electrically conductive additive,
F) from 0 to 30% by weight of further additives,
where the total of the percentages by weight of components A) to F) is 100%.

The present invention moreover relates to the use of these molding compositions for production of moldings of any type, and to the resultant moldings, preferably motor vehicle bodywork parts of any type.

Polymer blends based on polyamides and on polyphenylene ethers are used as a material for bodywork parts, because they have high heat resistance. Such products are marketed by way of example by GEP as Noryl®GTX. A disadvantage for the use as bodywork material is the comparatively high fall-off in stiffness under ambient conditions.

DE-A 101 49 152 describes thermoplastic molding compositions based on polyamides, on graft rubbers of ABS type, and on fine-particle fillers, as a material for bodywork parts. Such products are marketed by way of example by Lanxess with the trademark Triax®. While the stiffness of these products is higher than that of Noryl®GTX, the toughness of this material is in most cases inadequate.

WO 2004/056919 discloses conductive thermoplastic molding compositions which comprise mixtures of various conductivity additives.

WO 2004/048452 discloses conductive thermoplastic molding compositions based on polyamides, graft copolymers, and antistatic agents. These products likewise have low impact resistance.

WO 2006/42705 discloses PA molding compositions which comprise highly branched or hyperbranched polymers as flow improvers.

It was therefore an object of the present invention to provide thermoplastic PA molding compositions which have improved flowability and also demoldability, together with better low-temperature impact resistance.

This object is achieved via the molding compositions defined in the introduction. Preferred embodiments are found in the subclaims.

Surprisingly, the inventive molding compositions have not only improved flowability but also markedly improved ductility at −30° C.

The inventive molding compositions comprise, as component A), from 40 to 96% by weight, preferably from 45 to 92% by weight, and in particular from 50 to 91% by weight, of at least one semiaromatic polyamide.

Preference is given to those semiaromatic copolyamides, such as PA 6/6T and PA 66/6T, whose triamine content is less than 0.5% by weight, preferably less than 0.3% by weight (see EPA 299 444).

The preferred semiaromatic copolyamides having low triamine content can be prepared by the processes described in EP-A 129 195 and 129 196.

The inventive thermoplastic molding compositions comprise, as component A), at least one semiaromatic copolyamide having the structure described below:

The semiaromatic copolyamides A) comprise, as component $a_1$), from 40 to 90% by weight of units which derive from terephthalic acid and hexamethylenediamine. A small proportion of the terephthalic acid, preferably not more than 10% by weight of the entire aromatic dicarboxylic acids used, can be replaced by isophthalic acid or other aromatic dicarboxylic acids, preferably those in which the carboxy groups are in para-position.

Alongside the units which derive from terephthalic acid and hexamethylenediamine, other units present in the semiaromatic copolyamides are units derived from ε-caprolactam ($a_2$) and/or units which derive from adipic acid and hexamethylenediamine ($a_3$).

The proportion of units which derive from ε-caprolactam is at most 50% by weight, preferably from 20 to 50% by weight, in particular from 25 to 40% by weight, while the proportion of units which derive from adipic acid and hexamethylenediamine is up to 60% by weight, preferably from 30 to 60% by weight, and in particular from 35 to 55% by weight.

The copolyamides can also comprise not only units of ε-caprolactam but also units of adipic acid and hexamethylenediamine; in this case, care has to be taken that the proportion of units free from aromatic groups is at least 10% by weight, preferably at least 20% by weight. There is no particular restriction here on the ratio of the units which derive from ε-caprolactam and from adipic acid and hexamethylenediamine.

Polyamides having from 50 to 80% by weight, in particular 60 to 75% by weight, of units which derive from terephthalic acid and hexamethylenediamine (units $a_1$)) and from 20 to 50% by weight, preferably from 25 to 40% by weight, of units which derive from ε-caprolactam (units $a_2$)) have proven particularly advantageous for many applications.

The inventive semiaromatic copolyamides can also comprise, alongside the units $a_1$) to $a_3$) described above, subordinate amounts, preferably not more than 15% by weight, in particular not more than 10% by weight, of further polyamide units ($a_4$) known from other polyamides. These units can derive from dicarboxylic acids having from 4 to 16 carbon atoms and from aliphatic or cycloaliphatic diamines having from 4 to 16 carbon atoms, or else from aminocarboxylic acids and, respectively, corresponding lactams having from 7 to 12 carbon atoms. To mention just a few suitable monomers of these types: suberic acid, azelaic acid, sebacic acid or isophthalic acid as representatives of the dicarboxylic acids, 1,4-butanediamine, 1,5-pentanediamine, piperazine, 4,4'-diaminodicyclohexylmethane, 2,2-(4,4'-diaminodicyclohexyl)propane or 3,3'-dimethyl-4,4'-diaminodicyclohexylmethane as representatives of the diamines, and caprylolactam, enantholactam, omega-aminoundecanoic acid and laurolactam as representatives of lactams or aminocarboxylic acids.

The melting points of the semiaromatic copolyamides A) are in the range from 260 to above 300° C., and this high melting point is also attended by a high glass transition temperature which is generally more than 75° C., in particular more than 85° C.

The melting points of binary copolyamides based on terephthalic acid, hexamethylenediamine, and ε-caprolactam, given contents of about 70% by weight of units which derive from terephthalic acid and hexamethylenediamine, are in the region of 300° C., their glass transition temperature being more than 110° C.

The melting points of binary copolyamides based on terephthalic acid, adipic acid, and hexamethylenediamine (HMD), even at relatively low contents of about 55% by weight of units composed of terephthalic acid and hexamethylenediamine reach 300° C. and more, but the glass transition temperature is not quite as high as for binary copolyamides which comprise ε-caprolactam instead of adipic acid or adipic acid/HMD.

BRIEF SUMMARY OF THE INVENTION

The invention relates to a thermoplastic molding composition comprising
A) from 40 to 96% by weight of a semiaromatic polyamide,
B) from 2 to 30% by weight of a copolymer composed of
  $B_1$) from 35 to 89.9% by weight of ethylene,
  $B_2$) from 10 to 60% by weight of 1-octane or 1-butene or a mixture of thereof, and
  $B_3$) from 0.05 to 5% by weight of functional monomers, where the functional monomers are carboxylic acid groups, carboxylic anhydride groups, carboxylic ester groups, carboxamide groups, carboxamide groups, amino groups, hydroxy groups, epoxy groups, urethane groups, or oxazoline groups, or a mixture of thereof,
C) from 1 to 50% by weight of fibrous or particulate fillers or a mixture of thereof,
D) from 0.1 to 10% by weight of
  $D_1$) at least one highly branched or hyperbranched polycarbonate with an OH number of from 1 to 600 mg KOH/g of polycarbonate (to DIN 53240, part 2), or
  $D_2$) at least on highly branched of hyperbranched polyester of $A_xB_y$ type, where x is at least 1.1 and y is at least 2.1,
or a mixture of these,
E) from 0 to 15% by weight of an electrically conductive additive,
F) from 0 to 30% by weight of further additives,
where the total of the percentages by weight of components A) to F) is 100%.

The invention also relates to the process to prepare the molding composition and its use.

The semiaromatic copolyamides A) can by way of example be prepared by the process described in EP-A 129 195 and EP-A 129 196, and EP-A 299 444.

The viscosity number, measured on a 0.5% strength solution (0.5 g/100 ml) in 96% by weight $H_2SO_4$ at 23° C., is generally from 100 to 300 ml/g, preferably from 110 to 250 ml/g to ISO 307.

It is also possible to use a mixture of above polyamides.

The inventive molding compositions comprise, as component B), from 2 to 30% by weight, preferably from 3 to 25% by weight, and in particular from 4 to 20% by weight, of a copolymer composed of
$B_1$) from 35 to 89.9% by weight of ethylene,
$B_2$) from 10 to 60% by weight of 1-octene or 1-butene or propylene or a mixture of these, and
$B_3$) from 0.05 to 5% by weight of functional monomers, where the functional monomers have been selected from the group of the carboxylic acid groups, carboxylic anhydride groups, carboxylic ester groups, carboxamide groups, carboximide groups, amino groups, hydroxy groups, epoxy groups, urethane groups, or oxazoline groups, or a mixture of these.

The proportion of the functional groups $B_3$) is from 0.1 to 5% by weight, preferably from 0.2 to 4% by weight, and in particular from 0.3 to 3.5% by weight, based on 100% by weight of B).

Particularly preferred components $B_3$) are composed of an ethylenically unsaturated mono- or dicarboxylic acid or of a functional derivative of such an acid.

In principle, any of the primary, secondary, and tertiary $C_1$-$C_{18}$-alkyl esters of acrylic acid or methacrylic acid are suitable, but preference is given to esters having from 1 to 12 carbon atoms, in particular having from 2 to 10 carbon atoms.

Examples of these are methyl, ethyl, propyl, n-butyl, isobutyl, tert-butyl, 2-ethylhexyl, octyl, and decyl acrylates and the corresponding methacrylates. Among these, particular preference is given to n-butyl acrylate and 2-ethylhexyl acrylate.

Instead of the esters or in addition to these, the olefin polymers can also comprise acid-functional and/or latent acid-functional monomers of ethylenically unsaturated mono- or dicarboxylic acids, or monomers having epoxy groups.

Further examples that may be mentioned of monomers $B_3$) are acrylic acid, methacrylic acid, tertiary alkyl esters of these acids, in particular tert-butyl acrylate, and dicarboxylic acids, such as maleic acid and fumaric acid, or derivatives of these acids, or else their monoesters.

Latent acid-functional monomers are intended to be compounds which under the polymerization conditions or during incorporation of the olefin polymers into the molding compositions form free acid groups. Examples that may be mentioned of these are anhydrides of dicarboxylic acids having up to 20 carbon atoms, in particular maleic anhydride, and tertiary $C_1$-$C_{12}$-alkyl esters of the abovementioned acids, in particular tert-butyl acrylate and tert-butyl methacrylate.

The acid-functional or latent acid-functional monomers and the monomers comprising epoxy groups are preferably incorporated into the olefin polymers via addition of compounds of the general formulae I-IV to the monomer mixture.

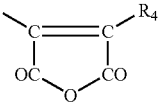

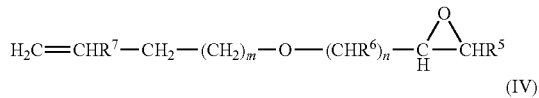

(III)

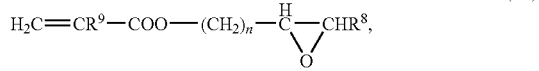

(IV)

where the radicals $R^1$-$R^9$ are hydrogen or alkyl groups having 1 to 6 carbon atoms, and m is a whole number from 0 to 20, and n is a whole number from 0 to 10.

Hydrogen is preferred for $R^1$-$R^7$, the value 0 or 1 is preferred for m, and the value 1 is preferred for n. The corresponding compounds are maleic acid, fumaric acid, maleic anhydride, and alkenyl glycidyl ether or vinyl glycidyl ether.

Preferred compounds of the formulae I, II, III, and IV are maleic acid and maleic anhydride as component $B_3$) and esters of acrylic acid and/or methacrylic acid where these comprise epoxy groups, particular preference being given to glycidyl acrylate and glycidyl methacrylate (as component $B_3$)).

Particular preference is given to olefin polymers composed of from 50 to 89.8% by weight of ethylene, preferably from 55 to 85.7% by weight,
from 10 to 50% by weight of 1-butene, preferably from 14 to 44% by weight,
from 0.2 to 2% by weight of acrylic acid or maleic acid or maleic anhydride, preferably from 0.3 to 1% by weight,
or
from 40 to 69.9% by weight of ethylene, preferably from 50 to 64.9% by weight,
from 30 to 60% by weight of 1-octene, preferably from 35 to 49% by weight,
from 0.05 to 2% by weight of acrylic acid or maleic acid or maleic anhydride, preferably from 0.1 to 1% by weight.

The ethylene copolymers described above can be prepared by processes known per se, preferably via random copolymerization at high pressure and elevated temperature.

The melt index of the ethylene copolymers is generally in the range from 1 to 80 g/10 min (measured at 190° C. with 2.16 kg load).

The molar mass of these ethylene-α-olefin copolymers is from 10 000 to 500 000 g/mol, preferably from 15 000 to 400 000 g/mol (Mn, determined by means of GPC in 1,2,4-trichlorobenzene with PS calibration).

In one particular embodiment, ethylene-α-olefin copolymers prepared by means of "single site catalysts" are used. Further details can be found in U.S. Pat. No. 5,272,236. In this case, the polydispersity of the ethylene-α-olefin copolymers is smaller than 4, preferably smaller than 3.5, these values being small for polyolefins.

Preferred commercially available products B used are Exxelor® VA 1801 or 1803, Kraton® G 1901 FX, or Fusabond® N NM493 D from Exxon, Kraton, and DuPont, and also Tafiner®MH 7010 from Mitsui.

It is, of course, also possible to use a mixture of the types of rubber listed above.

Fibrous or particulate fillers C) that may be mentioned are carbon fibers, glass fibers, glass beads, amorphous silica, calcium silcate, calcium metasilicate, magnesium carbonate, kaolin, chalk, powdered quartz, mica, barium sulfate, and feldspar, the amounts used of these being from 1 to 50% by weight, in particular from 2 to 40% by weight, preferably from 3 to 30% by weight.

Preferred fibrous fillers which may be mentioned are carbon fibers, aramid fibers, and potassium titanate fibers, particular preference being given to glass fibers in the form of E glass. These may be used in the form of rovings or chopped glass in the forms commercially available.

The fibrous fillers may have been surface-pretreated with a silane compound to improve compatibility with the thermoplastic.

Suitable silane compounds are those of the general formula

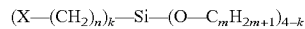

where the substituents are:

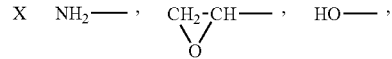

n is a whole number from 2 to 10, preferably from 3 to 4
m is a whole number from 1 to 5, preferably from 1 to 2
k is a whole number from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used of the silane compounds for surface coating are from 0.01 to 2% by weight, preferably from 0.025 to 1.0% by weight, and in particular from 0.05 to 0.5% by weight (based on C).

Acicular mineral fillers are also suitable.

For the purposes of the invention, acicular mineral fillers are mineral fillers with very pronounced acicular character. An example which may be mentioned is acicular wollastonite. The L/D (length/diameter) ratio of the mineral is preferably from 8:1 to 35:1, with preference from 8:1 to 11:1. If appropriate, the mineral filler may have been pretreated with the abovementioned silane compounds; however, this pretreatment is not essential.

Other fillers which may be mentioned are kaolin, calcined kaolin, wollastonite, talc, and chalk, and also lamellar or acicular nanofillers, preferred amounts being from 0.1 to 20%. Those preferably used here are boehmite, bentonite, montmorillonite, vermiculite, hectorite, and laponite. The lamellar nanofillers are organically modified according to the prior art in order to obtain good compatibility of the lamellar nanofillers with the organic binder. Addition of the lamellar or acicular nanofillers to the inventive nano composites leads to a further rise in mechanical strength.

The inventive molding compositions preferably comprise talc as component C), this being a hydrated magnesium silicate whose constitution is $Mg_3[(OH)_2/Si_4O_{10}]$ or 3 $MgO.4SiO_2.H_2O$. These "three-layer phyllosilicates" have triclinic, monoclinic, or rhombic crystal structure, with lamellar habit. Other trace elements which may be present are Mn, Ti, Cr, Ni, Na, and K, and the OH group may to some extent have been replaced by fluoride.

It is particularly preferable to use talc comprising 99.5% of particles whose sizes are <20 µm. The particle size distribution is usually determined via sedimentation analysis DIN 6616-1, and is preferably:
<20 µm 99.5% by weight
<10 µm 99% by weight
<5 µm 85% by weight
<3 µm 60% by weight
<2 µm 43% by weight
Products of this type are commercially available as Micro-Talc I.T. extra (Omya).

The inventive molding compositions comprise, as component D), from 0.1 to 10% by weight, preferably from 0.1 to 5% by weight, and in particular from 0.1 to 2% by weight, of D1) at least one highly branched or hyperbranched polycarbonate with an OH number of from 1 to 600 mg KOH/g of polycarbonate, preferably from 10 to 550 mg KOH/g of polycarbonate, and in particular from 50 to 550 mg KOH/g of polycarbonate (to DIN 53240, Part 2), or of at least one hyperbranched polyester as component D2), or a mixture of these, as explained below.

For the purposes of this invention, hyperbranched polycarbonates D1) are non-crosslinked macromolecules having hydroxy groups and carbonate groups, these having both structural and molecular non-uniformity. Their structure may firstly be based on a central molecule in the same way as dendrimers, but with non-uniform chain length of the branches, Secondly, they may also have a linear structure with functional pendant groups, or else they may combine the two extremes, having linear and branched molecular portions. See also P. J. Flory, J. Am. Chem. Soc. 1952, 74, 2718, and H. Frey et al., Chem. Eur. J. 2000, 6, no. 14, 2499 for the definition of dendrimeric and hyperbranched polymers.

"Hyperbranched" in the context of the present invention means that the degree of branching (DB), i.e. the sum of the average number of dendritic linkages and of terminal units divided by the sum of the average number of all linkages (dendritic, linear, and terminal linkages) and multiplied by 100, is from 10 to 99.9%, preferably from 20 to 99% and particularly preferably from 20 to 95%.

"Dendrimeric" in the context of the present invention means that the degree of branching is from 99.9 to 100%. See H. Frey et al., Acta Polym. 1997, 48, 30 for the definition of "degree of branching".

Component D1) preferably has a number-average molar mass Mn of from 100 to 15 000 g/mol, preferably from 200 to 12 000 g/mol, and in particular from 500 to 10 000 g/mol (GPC, PMMA standard).

The glass transition temperature $T_g$ is in particular from −80° C. to +140° C., preferably from −60 to 120° C. (according to DSC, DIN 53765).

In particular, the viscosity (mPas) at 23° C. (to DIN 53019) is from 50 to 200 000, in particular from 100 to 150 000, and very particularly preferably from 200 to 100 000.

Component D1) is preferably obtainable via a process which comprises at least the following steps:

a) reaction of at least one organic carbonate (A) of the general formula $RO[(CO)]_nOR$ with at least one aliphatic, aliphatic/aromatic or aromatic alcohol (B) which has at least 3 OH groups, with elimination of alcohols ROH to give one or more condensates (K), where each R, independently of the others, is a straight-chain or branched aliphatic, aromatic/aliphatic or aromatic hydrocarbon radical having from 1 to 20 carbon atoms, and where the radicals R may also have bonding to one another to form a ring, and n is a whole number from 1 to 5, or ab) reaction of phosgene, diphosgene, or triphosgene with abovementioned alcohol (B), with elimination of hydrogen chloride, and b) intermolecular reaction of the condensates (K) to give a highly functional, highly branched, or highly functional, hyperbranched polycarbonate, where the quantitative proportion of the OH groups to the carbonates in the reaction mixture is selected in such a way that the condensates (K) have an average of either one carbonate group and more than one OH group or one OH group and more than one carbonate group.

Phosgene, diphosgene, or triphosgene may be used as starting material, but preference is given to organic carbonates.

Each of the radicals R of the organic carbonates (A) used as starting material and having the general formula $RO(CO)_nOR$ is, independently of the others, a straight-chain or branched aliphatic, aromatic/aliphatic or aromatic hydrocarbon radical having from 1 to 20 carbon atoms. The two radicals R may also have bonding to one another to form a ring. The radical is preferably an aliphatic hydrocarbon radical, and particularly preferably a straight-chain or branched alkyl radical having from 1 to 5 carbon atoms, or a substituted or unsubstituted phenyl radical.

In particular, use is made of simple carbonates of the formula $RO(CO)_nOR$; n is preferably from 1 to 3, in particular 1.

By way of example, dialkyl or diaryl carbonates may be prepared from the reaction of aliphatic, araliphatic, or aromatic alcohols, preferably monoalcohols, with phosgene. They may also be prepared by way of oxidative carbonylation of the alcohols or phenols by means of CO in the presence of noble metals, oxygen, or $NO_x$. In relation to preparation methods for diaryl or dialkyl carbonates, see also "Ullmann's Encyclopedia of Industrial Chemistry", 6th edition, 2000 Electronic Release, Verlag Wiley-VCH.

Examples of suitable carbonates comprise aliphatic, aromatic/aliphatic or aromatic carbonates, such as ethylene carbonate, propylene 1,2- or 1,3-carbonate, diphenyl carbonate, ditoiyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, or didodecyl carbonate.

Examples of carbonates where n is greater than 1 comprise dialkyl dicarbonates, such as di(tert-butyl) dicarbonate, or dialkyl tricarbonates, such as di(tert-butyl) tricarbonate.

It is preferable to use aliphatic carbonates, in particular those in which the radicals comprise from 1 to 5 carbon atoms, e.g. dimethyl carbonate, diethyl carbonate, dipropyl carbonate, dibutyl carbonate, or diisobutyl carbonate.

The organic carbonates are reacted with at least one aliphatic alcohol (B) which has at least 3 OH groups, or with mixtures of two or more different alcohols.

Examples of compounds having at least three OH groups comprise glycerol, trimethylolmethane, trimethylolethane, trimethylolpropane, 1,2,4-butanetriol, tris(hydroxymethyl) amine, tris(hydroxyethyl)amine, tris(hydroxypropyl)amine, pentaerythritol, diglycerol, triglycerol, polyglycerols, bis(trimethylolpropane), tris(hydroxymethyl) isocyanurate, tris (hydroxyethyl) isocyanurate, phloroglucinol, trihydroxytoluene, trihydroxydimethylbenzene, phloroglucides, hexahydroxybenzene, 1,3,5-benzenetrimethanol, 1,1,1-tris (4'-hydroxyphenyl)methane, 1,1,1-tris(4'-hydroxyphenyl) ethane, or sugars, e.g. glucose, trihydric or higher polyhydric polyetherols based on trihydric or higher polyhydric alcohols and ethylene oxide, propylene oxide, or butylene oxide, or polyesterols. Particular preference is given here to glycerol, trimethylolethane, trimethylolpropane, 1,2,4-butanetriol, pentaerythritol, and also their polyetherols based on ethylene oxide or propylene oxide.

These polyhydric alcohols may also be used in a mixture with dihydric alcohols (B'), with the proviso that the average total OH functionality of all of the alcohols used is greater than 2. Examples of suitable compounds having two OH groups comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, 1,1'-bis(4-hydroxyphenyl)-3,3,5-trimethylcyclohexane, resorcinol, hydroquinone, 4,4'-dihydroxyphenyl, bis(4-bis (hydroxyphenyl) sulfide, bis(4-hydroxyphenyl) sulfone, bis (hydroxymethyl)benzene, bis(hydroxymethyl)toluene, bis (p-hydroxyphenyl)methane, bis(p-hydroxyphenyl)ethane, 2,2-bis(p-hydroxyphenyl)propane, 1,1-bis(p-hydroxyphenyl)cyclohexane, dihydroxybenzophenone, dihydric polyether polyols based on ethylene oxide, propylene oxide, butylene oxide, or mixtures of these, polytetrahydrofuran, polycaprolactone, or polyesterols based on dials and dicarboxylic acids.

The diols serve for fine adjustment of the properties of the polycarbonate. If use is made of dihydric alcohols, the ratio of dihydric alcohols B)' to the at least trihydric alcohols (B) is set by the person skilled in the art and depends on the desired properties of the polycarbonate. The amount of the alcohol(s) (B') is generally from 0 to 39.9 mol %, based on the total amount of all of the alcohols (B) and (B') taken together. The amount is preferably from 0 to 35 mol %, particularly preferably from 0 to 25 mol %, and very particularly preferably from 0 to 10 mol %.

The reaction of phosgene, diphosgene, or triphosgene with the alcohol or alcohol mixture generally takes place with elimination of hydrogen chloride, and the reaction of the carbonates with the alcohol or alcohol mixture to give the inventive highly functional highly branched polycarbonate takes place with elimination of the monofunctional alcohol or phenol from the carbonate molecule.

The highly functional highly branched polycarbonates formed by the inventive process have termination by hydroxy groups and/or by carbonate groups after the reaction, i.e. with no further modification. They have good solubility in various solvents, e.g. in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate, or propylene carbonate.

For the purposes of this invention, a highly functional polycarbonate is a product which, besides the carbonate groups which form the polymer skeleton, further has at least three, preferably at least six, more preferably at least ten, terminal or pendant functional groups. The functional groups are carbonate groups and/or OH groups. There is in principle no upper restriction on the number of the terminal or pendant functional groups, but products having a very high number of functional groups can have undesired properties, such as high viscosity or poor solubility. The highly functional polycarbonates of the present invention mostly have not more than 500 terminal or pendant functional groups, preferably not more than 100 terminal or pendant functional groups.

When preparing the highly functional polycarbonates D1), it is necessary to adjust the ratio of the compounds comprising OH groups to phosgene or carbonate in such a way that the simplest resultant condensate (hereinafter termed condensate (K)) comprises an average of either one carbonate group or carbamoyl group and more than one OH group or one OH group and more than one carbonate group or carbamoyl group. The simplest structure of the condensate (K) composed of a carbonate (A) and a di- or polyalcohol (B) here results in the arrangement $XY_n$ or $Y_nX$, where X is a carbonate group, Y is a hydroxy group, and n is generally a number from 1 to 6, preferably from 1 to 4, particularly preferably from 1 to 3. The reactive group which is the single resultant group here is generally termed "focal group" below.

By way of example, if during the preparation of the simplest condensate (K) from a carbonate and a dihydric alcohol the reaction ratio is 1:1, the average result is a molecule of XY type, illustrated by the general formula 1.

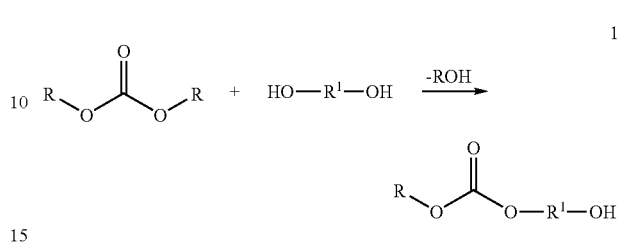

During the preparation of the condensate (K) from a carbonate and a trihydric alcohol with a reaction ratio of 1:1, the average result is a molecule of $XY_2$ type, illustrated by the general formula 2. A carbonate group is focal group here.

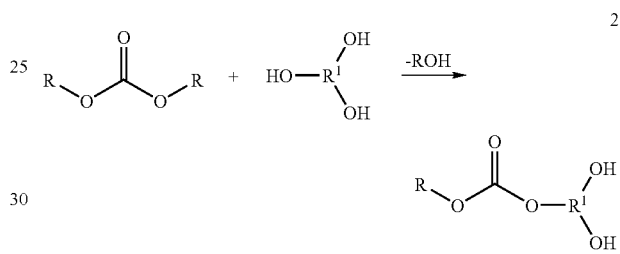

During the preparation of the condensate (K) from a carbonate and a tetrahydric alcohol, likewise with the reaction ratio 1:1, the average result is a molecule of $XY_3$ type, illustrated by the general formula 3. A carbonate group is focal group here.

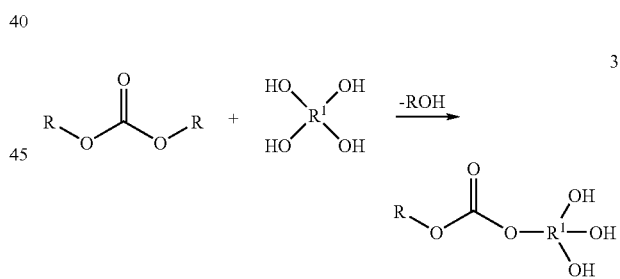

R in the formulae 1-3 has the definition given at the outset, and $R^1$ is an aliphatic or aromatic radical.

The condensate (K) may, by way of example, also be prepared from a carbonate and a trihydric alcohol, as illustrated by the general formula 4, the molar reaction ratio being 2:1. Here, the average result is a molecule of $X_2Y$ type, an OH group being focal group here. In formula 4, R and $R^1$ are as defined in formulae 1-3.

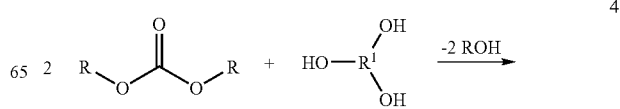

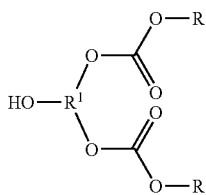

If difunctional compounds, e.g. a dicarbonate or a diol, are also added to the components, this extends the chains, as illustrated by way of example in the general formula 5. The average result is again a molecule of $XY_2$ type, a carbonate group being focal group.

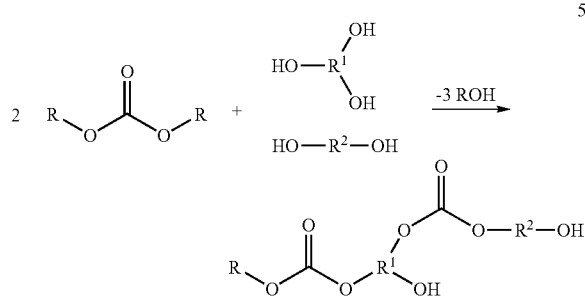

In formula 5, $R^2$ is an organic, preferably aliphatic radical, and R and $R^1$ are as defined above.

It is also possible to use two or more condensates (K) for the synthesis. Here, firstly two or more alcohols or two or more carbonates may be used. Furthermore, mixtures of various condensates of different structure can be obtained via the selection of the ratio of the alcohols used and of the carbonates or the phosgenes. This may be illustrated taking the example of the reaction of a carbonate with a trihydric alcohol. If the starting products are used in a ratio of 1:1, as shown in (II), the result is an $XY_2$ molecule. If the starting products are used in a ratio of 2:1, as shown in (IV), the result is an $X_2Y$ molecule. If the ratio is from 1:1 to 2:1, the result is a mixture of $XY_2$ and $X_2Y$ molecules.

According to the invention, the simple condensates (K) described by way of example in the formulae 1-5 preferentially react intermolecularly to form highly functional polycondensates, hereinafter termed polycondensates (P). The reaction to give the condensate (K) and to give the polycondensate (P) usually takes place at a temperature of from 0 to 250° C., preferably from 60 to 160° C., in bulk or in solution. Use may generally be made here of any of the solvents which are inert with respect to the respective starting materials. Preference is given to use of organic solvents, e.g. decane, dodecane, benzene, toluene, chlorobenzene, xylene, dimethylformamide, dimethylacetamide, or solvent naphtha.

In one preferred embodiment, the condensation reaction is carried out in bulk. To accelerate the reaction, the phenol or the monohydric alcohol ROH liberated during the reaction can be removed by distillation from the reaction equilibrium if appropriate at reduced pressure.

If removal by distillation is intended, it is generally advisable to use those carbonates which liberate alcohols ROH with a boiling point below 140° C. during the reaction. Catalysts or catalyst mixtures may also be added to accelerate the reaction. Suitable catalysts are compounds which catalyze esterification or transesterification reactions, e.g. alkali metal hydroxides, alkali metal carbonates, alkali metal hydrogencarbonates, preferably of sodium, of potassium, or of cesium, tertiary amines, guanidines, ammonium compounds, phosphonium compounds, organoaluminum, organotin, organozinc, organotitanium, organozirconium, or organobismuth compounds, or else what are known as double metal cyanide (DMC) catalysts, e.g. as described in DE 10138216 or DE 10147712.

It is preferable to use potassium hydroxide, potassium carbonate, potassium hydrogencarbonate, diazabicyclooctane (DABCO), diazabicyclononene (DBN), diazabicycloundecene (DBU), imidazoles, such as imidazole, 1-methylimidazole, or 1,2-dimethylimidazole, titanium tetrabutoxide, titanium tetraisopropoxide, dibutyltin oxide, dibutyltin dilaurate, stannous dioctoate, zirconium acetylacetonate, or mixtures thereof.

The amount of catalyst generally added is from 50 to 10 000 ppm by weight, preferably from 100 to 5000 ppm by weight, based on the amount of the alcohol mixture or alcohol used.

It is also possible to control the intermolecular polycondensation reaction via addition of the suitable catalyst or else via selection of a suitable temperature. The average molecular weight of the polymer (P) may moreover be adjusted by way of the composition of the starting components and by way of the residence time.

The condensates (K) and the polycondensates (P) prepared at an elevated temperature are usually stable at room temperature for a relatively long period.

The nature of the condensates (K) permits polycondensates (P) with different structures to result from the condensation reaction, these having branching but no crosslinking. Furthermore, in the ideal case, the polycondensates (P) have either one carbonate group as focal group and more than two OH groups or else one OH group as focal group and more than two carbonate groups. The number of the reactive groups here is the result of the nature of the condensates (K) used and the degree of polycondensation.

By way of example, a condensate (K) according to the general formula 2 can react via triple intermolecular condensation to give two different polycondensates (P), represented in the general formulae 6 and 7.

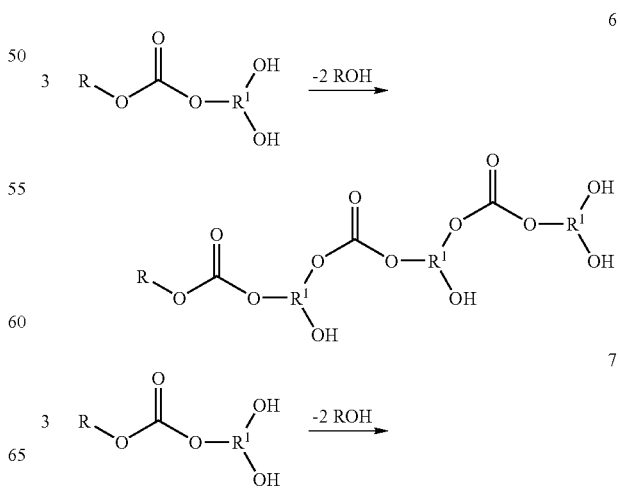

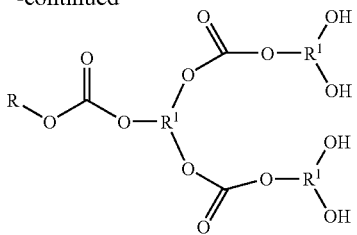

In formula 6 and 7, R and R¹ are as defined above.

There are various ways of terminating the intermolecular polycondensation reaction. By way of example, the temperature may be lowered to a range where the reaction stops and the product (K) or the polycondensate (P) is storage-stable.

It is also possible to deactivate the catalyst, for example in the case of basic catalysts via addition of Lewis acids or proton acids.

In another embodiment, as soon as the intermolecular reaction of the condensate (K) has produced a polycondensate (P) with the desired degree of polycondensation, a product having groups reactive toward the focal group of (p) may be added to the product (P) to terminate the reaction. In the case of a carbonate group as focal group, by way of example, a mono-, di-, or polyamine may be added. In the case of a hydroxy group as focal group, by way of example, a mono-, di-, or polyisocyanate, or a compound comprising epoxy groups, or an acid derivative which reacts with OH groups, can be added to the product (P).

The inventive highly functional polycarbonates are mostly prepared in the pressure range from 0.1 mbar to 20 bar, preferably at from 1 mbar to 5 bar, in reactors or reactor cascades which are operated batchwise, semicontinuously, or continuously.

The inventive products can be further processed without further purification after their preparation by virtue of the abovementioned adjustment of the reaction conditions and, if appropriate, by virtue of the selection of the suitable solvent.

In another preferred embodiment, the product is stripped, i.e. freed from low-molecular-weight, volatile compounds. For this, once the desired degree of conversion has been reached the catalyst may optionally be deactivated and the low-molecular-weight volatile constituents, e.g. monoalcohols, phenols, carbonates, hydrogen chloride, or volatile oligomeric or cyclic compounds, can be removed by distillation, if appropriate with introduction of a gas, preferably nitrogen, carbon dioxide, or air, if appropriate at reduced pressure.

Another preferred embodiment can give the inventive polycarbonates other functional groups besides the functional groups present by this stage by virtue of the reaction. The functionalization may take place during the process to increase molecular weight, or else subsequently, i.e. after completion of the actual polycondensation.

If, prior to or during the process to increase molecular weight, components are added which have other functional groups or functional elements besides hydroxy or carbonate groups, the result is a polycarbonate polymer with randomly distributed functionalities other than the carbonate or hydroxy groups.

Effects of this type can, by way of example, be achieved via addition, during the polycondensation, of compounds which bear other functional groups or functional elements, such as mercapto groups, primary, secondary or tertiary amino groups, ether groups, derivatives of carboxylic acids, derivatives of sulfonic acids, derivatives of phosphonic acids, silane groups, siloxane groups, aryl radicals, or long-chain alkyl radicals, besides hydroxy groups, carbonate groups or carbamoyl groups. Examples of compounds which may be used for modification by means of carbamate groups are ethanolamine, propanolamine, isopropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane, tris(hydroxyethyl)aminomethane, ethylenediamine, propylenediamine, hexamethylenediamine or isophoronediamine.

An example of a compound which can be used for modification with mercapto groups is mercaptoethanol. By way of example, tertiary amino groups can be produced via incorporation of N-methyldiethanolamine, N-methyldipropanolamine or N,N-dimethylethanolamine. By way of example, ether groups may be generated via co-condensation of dihydric or higher polyhydric polyetherols. Long-chain alkyl radicals can be introduced via reaction with long-chain alkanediols, and reaction with alkyl or aryl diisocyanates generates polycarbonates having alkyl, aryl, and urethane groups, or urea groups.

Ester groups can be produced via addition of dicarboxylic acids, tricarboxylic acids, or, for example, dimethyl terephthalate, or tricarboxylic esters.

Subsequent functionalization can be achieved by using an additional step of the process (step c)) to react the resultant highly functional highly branched, or highly functional hyperbranched polycarbonate with a suitable functionalizing reagent which can react with the OH and/or carbonate groups or carbamoyl groups of the polycarbonate.

By way of example, highly functional highly branched, or highly functional hyperbranched polycarbonates comprising hydroxy groups can be modified via addition of molecules comprising acid groups or isocyanate groups. By way of example, polycarbonates comprising acid groups can be obtained via reaction with compounds comprising anhydride groups.

Highly functional polycarbonates comprising hydroxy groups may moreover also be converted into highly functional polycarbonate polyether polyols via reaction with alkylene oxides, e.g. ethylene oxide, propylene oxide, or butylene oxide.

A great advantage of the process is its cost-effectiveness. Both the reaction to give a condensate (K) or polycondensate (P) and also the reaction of (K) or (P) to give polycarbonates with other functional groups or elements can take place in one reactor, this being advantageous technically and in terms of cost-effectiveness.

The inventive molding compositions may comprise, as component D2), at least one hyperbranched polyester of $A_xB_y$ type, where x is at least 1.1, preferably at least 1.3, in particular at least 2
y is at least 2.1, preferably at least 2.5, in particular at least 3.

Use may also be made of mixtures as units A and/or B, of course.

An $A_xB_y$-type polyester is a condensate composed of an x-functional molecule A and a y-functional molecule B. By way of example, mention may be made of a polyester composed of adipic acid as molecule A (x=2) and glycerol as molecule B (y=3).

For the purposes of this invention, hyperbranched polyesters D2) are non-crosslinked macromolecules having hydroxy groups and carboxy groups, these having both structural and molecular non-uniformity. Their structure may firstly be based on a central molecule in the same way as dendrimers, but with non-uniform chain length of the branches. Secondly, they may also have a linear structure with functional pendant groups, or else they may combine the two extremes, having linear and branched molecular portions. See also P. J. Flory, J. Am. Chem. Soc. 1952, 74, 2718, and H. Frey et al., Chem. Eur. J. 2000, 6, no. 14, 2499 for the definition of dendrimeric and hyperbranched polymers.

"Hyperbranched" in the context of the present invention means that the degree of branching (DB), i.e. the sum of the average number of dendritic linkages and of terminal units divided by the sum of the average number of all linkages (dendritic, linear, and terminal linkages) and multiplied by 100, is from 10 to 99.9%, preferably from 20 to 99% and particularly preferably from 20 to 95%.

"Dendrimeric" in the context of the present invention means that the degree of branching is from 99.9 to 100%. See H. Frey et al., Acta Polym. 1997, 48, 30 for the definition of "degree of branching".

Component D2) preferably has an $M_n$ of from 300 to 30 000 g/mol, in particular from 400 to 25 000 g/mol, and very particularly from 500 to 20 000 g/mol, determined by means of GPC, PMMA standard, dimethylacetamide eluent.

D2) preferably has an OH number of from 0 to 600 mg KOH/g of polyester, preferably from 1 to 500 mg KOH/g of polyester, in particular from 20 to 500 mg KOH/g of polyester to DIN 53240, and preferably a COOH number of from 0 to 600 mg KOH/g of polyester, preferably from 1 to 500 mg KOH/g of polyester, and in particular from 2 to 500 mg KOH/g of polyester.

The $T_g$ is preferably from −50° C. to 140° C., and in particular from −50 to 100° C. (by means of DSC, to DIN 53765).

Preference is particularly given to those components D2) in which at least one OH or COOH number is greater than 0, preferably greater than 0.1, and in particular greater than 0.5.

The inventive component D2) is in particular obtainable via the processes described below, specifically by reacting
(a) one or more dicarboxylic acids or one or more derivatives of the same with one or more at least trihydric alcohols or
(b) one or more tricarboxylic acids or higher polycarboxylic acids or one or more derivatives of the same with one or more diols
in the presence of a solvent and optionally in the presence of an inorganic, organometallic, or low-molecular-weight organic catalyst, or of an enzyme. The reaction in solvent is the preferred preparation method.

For the purposes of the present invention, highly functional hyperbranched polyesters D2) have molecular and structural non-uniformity. Their molecular non-uniformity distinguishes them from dendrimers, and they can therefore be prepared at considerably lower cost.

Among the dicarboxylic acids which can be reacted according to variant (a) are, by way of example, oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, and cis- and trans-cyclopentane-1,3-dicarboxylic acid,
where the abovementioned dicarboxylic acids may have substitution by one or more radicals selected from
$C_1$-$C_{10}$-alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl,
$C_3$-$C_{12}$-cycloalkyl groups, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl;
alkylene groups, such as methylene or ethylidene, or
$C_6$-$C_{14}$-aryl groups, such as phenyl, 1-naphthyl, 2-naphthyl, 1-anthryl, 2-anthryl, 9-anthryl, 1-phenanthryl, 2-phenanthryl, 3-phenanthryl, 4-phenanthryl, and 9-phenanthryl, preferably phenyl, 1-naphthyl, and 2-naphthyl, particularly preferably phenyl.

Examples which may be mentioned as representatives of substituted dicarboxylic acids are: 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid.

Among the dicarboxylic acids which can be reacted according to variant (a) are also ethylenically unsaturated acids, such as maleic acid and fumaric acid, and aromatic dicarboxylic acids, such as phthalic acid, isophthalic acid or terephthalic acid.

It is also possible to use mixtures of two or more of the abovementioned representative compounds.

The dicarboxylic acids may either be used as they stand or be used in the form of derivatives.

Derivatives are preferably
the relevant anhydrides in monomeric or else polymeric form,
mono- or dialkyl esters, preferably mono- or dimethyl esters, or the corresponding mono- or diethyl esters, or else the mono- and dialkyl esters derived from higher alcohols, such as n-propanol, isopropanol, n-butanol, isobutanol, tert-butanol, n-pentanol, n-hexanol,
and also mono- and divinyl esters, and
mixed esters, preferably methyl ethyl esters.

In the preferred preparation process it is also possible to use a mixture composed of a dicarboxylic acid and one or more of its derivatives. Equally, it is possible to use a mixture of two or more different derivatives of one or more dicarboxylic acids.

It is particularly preferable to use succinic acid, glutaric acid, adipic acid, phthalic acid, isophthalic acid, terephthalic acid, or the mono- or dimethyl esters thereof. It is very particularly preferable to use adipic acid.

Examples of at least trihydric alcohols which may be reacted are: glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, trimethylolbutane, trimethylolpropane or ditrimethylolpropane, trimethylolethane, pentaerythritol or dipentaerythritol; sugar alcohols, such as mesoerythritol, threitol, sorbitol, mannitol, or mixtures of the above at least trihydric alcohols. It is preferable to use glycerol, trimethylolpropane, trimethylolethane, and pentaerythritol.

Examples of tricarboxylic acids or polycarboxylic acids which can be reacted according to variant (b) are benzene-1,2,4-tricarboxylic acid, benzene-1,3,5-tricarboxylic acid, benzene-1,2,4,5-tetracarboxylic acid, and mellitic acid.

Tricarboxylic acids or polycarboxylic acids may be used in the inventive reaction either as they stand or else in the form of derivatives.

Derivatives are Preferably
- the relevant anhydrides in monomeric or else polymeric form,
- mono-, di-, or trialkyl esters, preferably mono-, di-, or trimethyl esters, or the corresponding mono-, di-, or triethyl esters, or else the mono-, di-, and triesters derived from higher alcohols, such as n-propanol, isopropanol, n-butanol, isobutanol, tert-butanol, n-pentanol, n-hexanol, or else mono-, di-, or trivinyl esters and mixed methyl ethyl esters.

For the purposes of the present invention, it is also possible to use a mixture composed of a tri- or polycarboxylic acid and one or more of its derivatives. For the purposes of the present invention it is likewise possible to use a mixture of two or more different derivatives of one or more tri- or polycarboxylic acids, in order to obtain component D2).

Examples of diols used for variant (b) of the present invention are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, inositol and derivatives, (2)-methylpentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H or mixtures of two or more representative compounds of the above compounds, where n is a whole number and n=from 4 to 25. One, or else both, hydroxy groups here in the abovementioned diols may also be replaced by SH groups. Preference is given to ethylene glycol, propane-1,2-diol, and diethylene glycol, triethylene glycol, dipropylene glycol, and tripropylene glycol.

The molar ratio of the molecules A to molecules B in the $A_xB_y$ polyester in the variants (a) and (b) is from 4:1 to 1:4, in particular from 2:1 to 1:2.

The at least trihydric alcohols reacted according to variant (a) of the process may have hydroxy groups of which all have identical reactivity. Preference is also given here to at least trihydric alcohols whose OH groups initially have identical reactivity, but where reaction with at least one acid group can induce a fall-off in reactivity of the remaining OH groups as a result of steric or electronic effects. By way of example, this applies when trimethylolpropane or pentaerythritol is used.

However, the at least trihydric alcohols reacted according to variant (a) may also have hydroxy groups having at least two different chemical reactivities.

The different reactivity of the functional groups here may derive either from chemical causes (e.g. primary/secondary/tertiary OH group) or from steric causes.

By way of example, the trial may comprise a triol which has primary and secondary hydroxy groups, a preferred example being glycerol.

When the inventive reaction is carried out according to variant (a), it is preferable to operate in the absence of dials and of monohydric alcohols.

When the inventive reaction is carried out according to variant (b), it is preferable to operate in the absence of mono- or dicarboxylic acids.

The inventive process is carried out in the presence of a solvent. By way of example, hydrocarbons are suitable, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene, and ortho- and meta-dichlorobenzene. Other solvents very particularly suitable in the absence of acidic catalysts are: ethers, such as dioxane or tetrahydrofuran, and ketones, such as methyl ethyl ketone and methyl isobutyl ketone.

According to the invention, the amount of solvent added is at least 0.1% by weight, based on the weight of the starting materials used and to be reacted, preferably at least 1% by weight, and particularly preferably at least 10% by weight. It is also possible to use excesses of solvent, based on the weight of starting materials used and to be reacted, e.g. from 1.01 to 10 times the amount. Solvent amounts of more than 100 times the weight of the starting materials used and to be reacted are not advantageous, because the reaction rate decreases markedly at markedly lower concentrations of the reactants, giving uneconomically long reaction times.

To carry out the process preferred according to the invention, operations may be carried out in the presence of a dehydrating agent as additive, added at the start of the reaction. Suitable examples are molecular sieves, in particular 4 Å molecular sieve, $MgSO_4$, and $Na_2SO_4$. During the reaction it is also possible to add further dehydrating agent or to replace dehydrating agent by fresh dehydrating agent. During the reaction it is also possible to remove the water or alcohol formed by distillation and, for example, to use a water trap.

The process may be carried out in the absence of acidic catalysts. It is preferable to operate in the presence of an acidic inorganic, organometallic, or organic catalyst, or a mixture composed of two or more acidic inorganic, organometallic, or organic catalysts.

For the purposes of the present invention, examples of acidic inorganic catalysts are sulfuric acid, phosphoric acid, phosphonic acid, hypophosphorous acid, aluminum sulfate hydrate, alum, acidic silica gel (pH=6, in particular =5), and acidic aluminum oxide. Examples of other compounds which can be used as acidic inorganic catalysts are aluminum compounds of the general formula $Al(OR)_3$ and titanates of the general formula $Ti(OR)_4$, where each of the radicals R may be identical or different and is selected independently of the others from $C_1$-$C_{10}$-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, $C_3$-$C_{12}$-cycloalkyl radicals, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl.

Each of the radicals R in $Al(OR)_3$ or $Ti(OR)_4$ is preferably identical and selected from isopropyl or 2-ethylhexyl.

Examples of preferred acidic organometallic catalysts are selected from dialkyltin oxides $R_2SnO$, where R is defined as above. A particularly preferred representative compound for acidic organometallic catalysts is di-n-butyltin oxide, which is commercially available as "oxo-tin", or di-n-butyltin dilaurate.

Preferred acidic organic catalysts are acidic organic compounds having, by way of example, phosphate groups, sulfonic acid groups, sulfate groups, or phosphonic acid groups. Particular preference is given to sulfonic acids, such as para-toluenesulfonic acid. Acidic ion exchangers may also be used as acidic organic catalysts, e.g. polystyrene resins comprising sulfonic acid groups and crosslinked with about 2 mol % of divinylbenzene.

It is also possible to use combinations of two or more of the abovementioned catalysts. It is also possible to use an immobilized form of those organic or organometallic, or else inorganic catalysts which take the form of discrete molecules.

If the intention is to use acidic inorganic, organometallic, or organic catalysts, according to the invention the amount used is from 0.1 to 10% by weight, preferably from 0.2 to 2% by weight, of catalyst.

The inventive process is carried out under inert gas, e.g. under carbon dioxide, nitrogen, or a noble gas, among which mention may particularly be made of argon.

The inventive process is carried out at temperatures of from 60 to 200° C. It is preferable to operate at temperatures of from 130 to 180° C., in particular up to 150° C., or below that temperature. Maximum temperatures up to 145° C. are particularly preferred, and temperatures up to 135° C. are very particularly preferred.

The pressure conditions for the inventive process are not critical per se. It is possible to operate at markedly reduced pressure, e.g. at from 10 to 500 mbar. The inventive process may also be carried out at pressures above 500 mbar. A reaction at atmospheric pressure is preferred for reasons of simplicity; however, conduct at slightly increased pressure is also possible, e.g. up to 1200 mbar. It is also possible to operate at markedly increased pressure, e.g. at pressures up to 10 bar. Reaction at atmospheric pressure is preferred.

The reaction time for the inventive process is usually from 10 minutes to 25 hours, preferably from 30 minutes to 10 hours, and particularly preferably from one to 8 hours.

Once the reaction has ended, the highly functional hyperbranched polyesters can easily be isolated, e.g. by removing the catalyst by filtration and concentrating the mixture, the concentration process here usually being carried out at reduced pressure. Other work-up methods with good suitability are precipitation after addition of water, followed by washing and drying.

Component D2) can also be prepared in the presence of enzymes or decomposition products of enzymes (according to DE-A 101 63163). For the purposes of the present invention, the term acidic organic catalysts does not include the dicarboxylic acids reacted according to the invention.

It is preferable to use lipases or esterases. Lipases and esterases with good suitability are *Candida cylindracea, Candida lipolytica, Candida rugosa, Candida antarctica, Candida utilis, Chromobacterium viscosum, Geotrichum viscosum, Geotrichum candidum, Mucor javanicus, Mucor mihei*, pig pancreas, *pseudomonas* spp., *pseudomonas fluorescens, Pseudomonas cepacia, Rhizopus arrhizus, Rhizopus delemar, Rhizopus niveus, Rhizopus oryzae, Aspergillus niger, Penicillium roquefortii, Penicillium camembertii*, or esterase from *Bacillus* spp. and *Bacillus thermoglucosidasius*. *Candida antarctica* lipase B is particularly preferred. The enzymes listed are commercially available, for example from Novozymes Biotech Inc., Denmark.

The enzyme is preferably used in immobilized form, for example on silica gel or Lewatit®. The processes for immobilizing enzymes are known per se, e.g. from Kurt Faber, "Biotransformations in organic chemistry", 3rd edition 1997, Springer Verlag, Chapter 3.2 "Immobilization" pp. 345-356. Immobilized enzymes are commercially available, for example from Novozymes Biotech Inc., Denmark.

The amount of immobilized enzyme used is from 0.1 to 20% by weight, in particular from 10 to 15% by weight, based on the total weight of the starting materials used and to be reacted.

The inventive process is carried out at temperatures above 60° C. It is preferable to operate at temperatures of 100° C. or below that temperature. Preference is given to temperatures up to 80° C., very particular preference is given to temperatures of from 62 to 75° C., and still more preference is given to temperatures of from 65 to 75° C.

The inventive process is carried out in the presence of a solvent. Examples of suitable compounds are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents are: ethers, such as dioxane or tetrahydrofuran, and ketones, such as methyl ethyl ketone and methyl isobutyl ketone.

The amount of solvent added is at least 5 parts by weight, based on the weight of the starting materials used and to be reacted, preferably at least 50 parts by weight, and particularly preferably at least 100 parts by weight. Amounts of more than 10 000 parts by weight of solvent are undesirable, because the reaction rate decreases markedly at markedly lower concentrations, giving uneconomically long reaction times.

The inventive process is carried out at pressures above 500 mbar. Preference is given to the reaction at atmospheric pressure or slightly increased pressure, for example at up to 1200 mbar. It is also possible to operate under markedly increased pressure, for example at pressures up to 10 bar. The reaction at atmospheric pressure is preferred.

The reaction time for the inventive process is usually from 4 hours to 6 days, preferably from 5 hours to 5 days, and particularly preferably from 8 hours to 4 days.

Once the reaction has ended, the highly functional hyperbranched polyesters can be isolated, e.g. by removing the enzyme by filtration and concentrating the mixture, this concentration process usually being carried out at reduced pressure. Other work-up methods with good suitability are precipitation after addition of water, followed by washing and drying.

The highly functional, hyperbranched polyesters obtainable by the inventive process feature particularly low contents of discolored and resinified material. For the definition of hyperbranched polymers, see also: P. J. Flory, J. Am. Chem. Soc. 1952, 74, 2718, and A. Sunder et al., Chem. Eur. J. 2000, 6, no. 1, 1-8. However, in the context of the present invention, "highly functional hyperbranched" means that the degree of branching, i.e. the average number of dendritic linkages plus the average number of end groups per molecule, is from 10 to 99.9%, preferably from 20 to 99%, particularly preferably from 30 to 90% (see in this connection H. Frey et al. Acta Polym. 1997, 48, 30).

The inventive polyesters have a molar mass $M_w$ of from 500 to 50 000 g/mol, preferably from 1000 to 20 000 g/mol, particularly preferably from 1000 to 19 000 g/mol. The polydispersity is from 1.2 to 50, preferably from 1.4 to 40, particularly preferably from 1.5 to 30, and very particularly preferably from 1.5 to 10. They are usually very soluble, i.e. clear solutions can be prepared using up to 50% by weight, in some cases even up to 80% by weight, of the inventive polyesters in tetrahydrofuran (THF), n-butyl acetate, ethanol, and numerous other solvents, with no gel particles detectable by the naked eye.

The inventive highly functional hyperbranched polyesters are carboxy-terminated, carboxy- and hydroxy-terminated, and preferably hydroxy-terminated.

The ratios of the components D1):D2) are preferably from 1:20 to 20:1, in particular from 1:15 to 15:1, and very particularly from 1:5 to 5:1 if a mixture of these is used.

The hyperbranched polycarbonates D1)/polyesters D2) used are particles whose size is from 20 to 500 nm. These nanoparticles take the form of fine particles in the polymer blend, the size of the particles in the compounded material being from 20 to 500 nm, preferably from 50 to 300 nm.

According to the invention, at least one electrically conductive additive can be used as component E). It is preferable to use only one electrically conductive additive, but it is also possible, if appropriate, to use two or more electrically conductive additives. Examples of suitable electrically conductive additives are carbon nanotubes, graphite, or conductive carbon black. Carbon nanotubes are preferably used as component E) in the inventive molding compositions.

For the purposes of the present invention, carbon nanotubes are carbon-containing macromolecules in which the carbon (mainly) has graphite structure and the individual graphite layers have a tubular arrangement. Nanotubes and their synthesis have been previously disclosed in the literature (for example J. Hu et al., Acc. Chem. Res. 32 (1999), 435-445). For the purposes of the present invention, it is in principle possible to use any type of nanotubes.

The diameter of the individual tubular graphite layers (graphite tubes) is preferably from 4 to 12 nm, in particular from 5 to 10 nm. In principle, nanotubes can be divided into what are known as single walled nanotubes (SWNTs) and multiwalled nanotubes (MWNTs). The MWNTs therefore have a plurality of stacked graphite tubes.

The external form of the tubes can moreover vary, and this can have uniform diameter internally and externally, but it is also possible to produce tubes in the shape of a knot and to produce vermicular structures.

The aspect ratio (length of a particular graphite tube with respect to its diameter) is at least >10, preferably >5. The length of the nanotubes is at least 10 nm. For the purposes of the present invention, MWNTs are preferred as component E). In particular, the aspect ratio of the MWNTs is about 1000:1 and their average length is about 10 000 nm.

The BET specific surface area is generally from 50 to 2000 $m^2/g$, preferably from 200 to 1200 $m^2/g$. HRTEM shows that the amounts of impurities (e.g. metal oxides) produced during the catalytic preparation process are generally from 0.1 to 12%, preferably from 0.2 to 10%.

Suitable "multiwall" nanotubes can be purchased from Hyperion Catalysis Int., Cambridge Mass. (USA) (see also EP 205 556, EP 969 128, EP 270 666, U.S. Pat. No. 6,844, 061).

The conductive carbon black used can be any commonly used form of carbon black, an example of a suitable product being Ketjenblack 300 commercially available from Akzo.

Conductivity modification can also be achieved by using conductive carbon black. Carbon black conducts electrons (F. Camona, Ann. Chim. Fr. 13, 395 (1988)) by virtue of graphitic layers embedded in amorphous carbon. Electricity is conducted within the aggregates composed of carbon black particles and between the aggregates if the distances between the aggregates are sufficiently small. In order to achieve conductivity while minimizing the amount added, it is preferable to use carbon blacks having an anisotropic structure (G. Wehner, Advances in Plastics Technology, APT 2005, Paper 11, Katowice 2005). In such carbon blacks, the primary particles associate to give anisotropic structures, the result being that the necessary distances between the carbon black particles for achievement of conductivity are achieved in compounded materials even at comparatively low loading (C. Van Bellingen, N. Probst, E. Grivei, Advances in Plastics Technology, APT 2005, Paper 13, Katowice 2005).

By way of example, the oil absorption of suitable types of carbon black (measured to ASTM 02414-01) is at least 60 ml/100 g, preferably more than 90 ml/100 g. The BET surface area of suitable products is more than 50 $m^2/g$, preferably more than 60 $m^2/g$ (measured to ASTM D3037-89). There can be various functional groups on the surface of the carbon black. The conductive carbon blacks can be prepared by various processes (G. Wehner, Advances in Plastics Technology, APT 2005, Paper 11, Katowice 2005).

It is also possible to use graphite as conductivity additive. Graphite is a form of carbon as described by way of example in A. F. Hollemann, E. Wieberg, N. Wieberg, "Lehrbuch der anorganischen Chemie" [Textbook of inorganic chemistry], $91^{st}$-$100^{th}$ edn., pp. 701-702. Graphite is composed of planar carbon layers mutually superposed. Graphite can be comminuted by milling. The particle site is in the range from 0.01 μm to 1 mm, preferably in the range from 1 to 250 μm.

The proportion of component E) in the inventive molding compositions is from 0 to 15% by weight, preferably from 1 to 14% by weight, particularly preferably from 1.5 to 13% by weight, based on the total weight of the molding composition.

The inventive thermoplastic molding compositions can comprise, as component F), amounts of up to 30% by weight, preferably up to 25% by weight, of other added materials, such as stabilizers, oxidation retarders, agents to counter decomposition due to heat and decomposition due to ultraviolet light, lubricants and mold-release agents, colorants, such as dyes and pigments, nucleating agents, plasticizers, etc.

The inventive molding compositions can comprise, as component F), from 0 to 5% by weight, preferably from 0.05 to 3% by weight, and in particular from 0.1 to 2% by weight, of at least one ester or amide of saturated or unsaturated aliphatic carboxylic acids having from 10 to 40, preferably from 16 to 22, carbon atoms with saturated aliphatic alcohols or amines having from 2 to 40, preferably from 2 to 6, carbon atoms.

The carboxylic acids can be monobasic or dibasic. Examples that may be mentioned are pelargonic acid, paimitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be mono- to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be mono- to trifunctional. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides or esters with amides in combination, in any desired mixing ratio.

Examples which may be mentioned of oxidation retarders and heat stabilizers are sterically hindered phenols and/or phosphites, hydroquinones, aromatic secondary amines, such as diphenylamines, various substituted members of these groups, and mixtures of these in concentrations of up to 1% by weight, based on the weight of the thermoplastic molding compositions.

UV stabilizers which may be mentioned, and are generally used in amounts of up to 2% by weight, based on the molding composition, are various substituted resorcinols, salicylates, benzotriazoles, and benzophenones.

Colorants which may be added are inorganic pigments, such as titanium dioxide, ultramarine blue, iron oxide, and carbon black, and also organic pigments, such as phthalocyanines, quinacridones and perylenes, and also dyes, such as nigrosine and anthraquinones.

Nucleating agents which may be used are sodium phenylphosphinate, alumina, silica, and preferably talc.

Preferred stabilizers are amounts of up to 2, preferably from 0.5 to 1.5, and in particular from 0.7 to 1, % by weight of aromatic secondary amines of the general formula I:

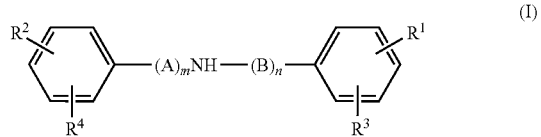

where
m and n=0 or 1,
A and B=$C_1$-$C_4$-alkyl- or phenyl-substituted tertiary C atom,
$R^1$ and $R^2$=hydrogen or a $C_1$-$C_6$-alkyl group in ortho or para position, optionally substituted by from 1 to 3 phenyl radicals, halogen, carboxy group, or a transition metal salt of this carboxy group, and
$R^3$ and $R^4$=hydrogen or a methyl radical in ortho or para position, if m plus n is 1 or a tertiary $C_3$-$C_9$-alkyl group in ortho or para position, optionally substituted by from 1 to 3 phenyl radicals, if m plus n is 0 or 1.

Preferred radicals A or B are symmetrically substituted tertiary carbon atoms, particular preference being given to dimethyl-substituted tertiary carbon. Preference is equally given to tertiary carbon atoms which have from 1 to 3 phenyl groups as substituents.

Preferred radicals $R^1$ or $R^2$ are para tent-butyl or tetramethyl-substituted n-butyl, where the methyl groups may preferably have been replaced by from 1 to 3 phenyl groups. Preferred halogens are chlorine and bromine. Examples of transition metals are those which can form transition metal salts with $R^1$ or $R^2$=carboxy.

Preferred radicals $R^3$ or $R^4$ are, for m plus n=2, hydrogen and, for m plus n=0 or 1, a tert-butyl radical in ortho or para position which in particular may have substitution by from 1 to 3 phenyl radicals.

Examples of secondary aromatic amines F) are
4,4'-bis(α,α'-tert-octyl)diphenylamine
4,4'-bis(α,α-dimethylbenzyl)diphenylamine
4,4'-bis(α-methylbenzhydryl)diphenylamine
4-(1,1,3,3-tetramethylbutyl)-4'-triphenylmethyldiphenylamine
4,4'-bis(α,α-p-trimethylbenzyl)diphenylamine
2,4,4'-tris(α,α-dimethylbenzyl)diphenylamine
2,2'-dibromo-4,4'-bis(α,α-dimethylbenzyl)diphenylamine
4,4'-bis(α,α-dimethylbenzyl)-2-carboxydiphenylamininickel-4,4'-bis(α,α-dimethylbenzyl)diphenylamine
2-sec-butyl-4,4'-bis(α,α-dimethylbenzyl)diphenylamine
4,4'-bis(α,α-dimethylbenzyl)-2-(α-methylheptyl)diphenylamine
2-(α-methylpentyl)-4,4'-ditrityldiphenylamine
4-α,α-dimethylbenzyl-4'-isopropoxydiphenylamine
2-(α-methylheptyl)-4'-(α,α-dimethylbenzyl)diphenylamine
2-(α-methylpentyl)-4'-trityldiphenylamine
4,4'-bis(tert-butyl)diphenylamine, and:

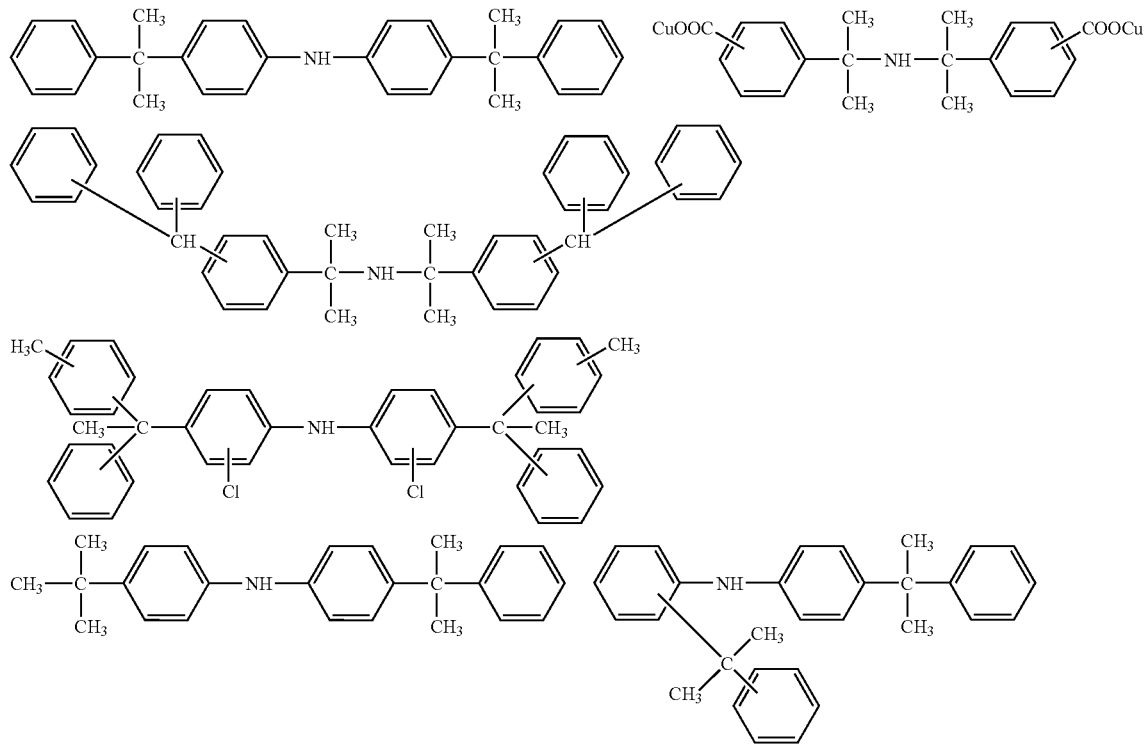

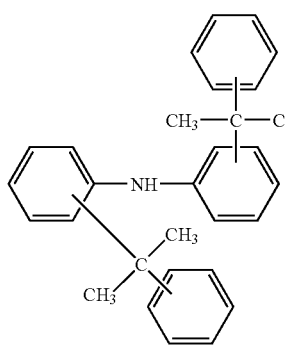 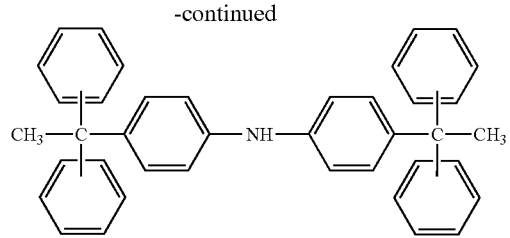

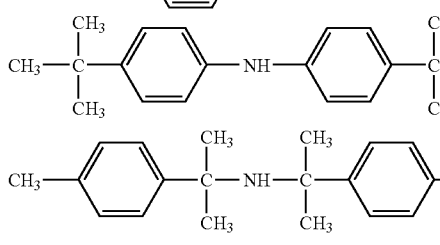 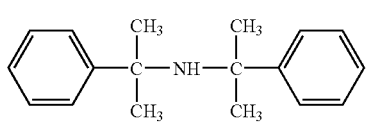

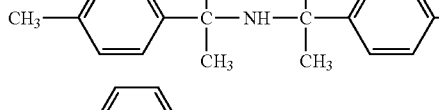 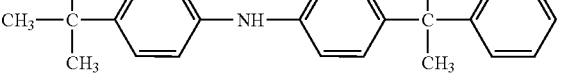

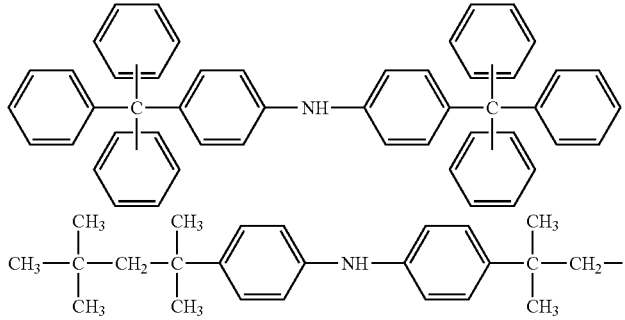 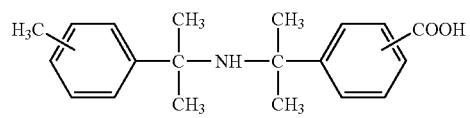

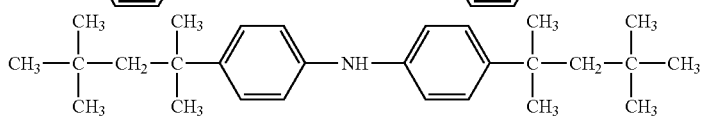

The processes described in CA-A 9 63 594 are used for preparation. Preferred secondary aromatic amines are diphenylamine and its derivatives, which are commercially available as Naugard® (Uniroyal). These are preferred in combination with up to 2000, preferably from 100 to 2000, with preference from 200 to 500, and in particular from 200 to 400 ppm of at least one phosphorus-comprising inorganic acid or derivatives thereof.

Preferred acids are hypophosphorous acid, phosphorous acid, or phosphoric acid, and also salts thereof with alkali metals, particular preference being given to sodium and potassium. Particularly preferred mixtures are hypophosphorous acid and phosphorous acid or, respectively, alkali metal salts thereof in a ratio of from 3:1 to 1:3. Organic derivatives of these acids are preferably ester derivatives of abovementioned acids.

The inventive thermoplastic molding compositions may be prepared by methods known per se, by mixing the starting components in conventional mixing apparatus, such as screw extruders, Brabender mixers or Banbury mixers, and then extruding them. The extrudate may be cooled and comminuted. It is also possible to premix individual components and then to add the remaining starting materials individually and/or likewise in a mixture. The mixing temperatures are generally from 230 to 320° C.

In a further preferred method of operation, the components B) to D), and also, if appropriate, E) and F) can be mixed with a prepolymer, compounded, and pelletized. The resultant pellets are then solid-phase-condensed, continuously or batchwise, under an inert gas, at a temperature below the melting point of component A) until the desired viscosity has been reached.

The inventive molding compositions feature good notched impact resistance, improved flowability, and, surprisingly, high ductility at −30° C. The inventive molding compositions moreover have relatively high heat resistance (HDT B).

These materials are suitable for production of fibers, of foils, and of moldings of any type. Some examples are as follows: cylinder head covers, motorcycle covers, inlet manifolds, charge-air cooler caps, plug connectors, gearwheels, cooling fan wheels, cooling water tanks.

Use in automotive interiors is for dashboards, steering column switches, seat components, headrests, center consoles, gearbox components and door modules, and use on automotive exteriors is for door handles, exterior mirror components, windshield wiper components, windshield wiper protective housings, grilles, roof rails, sunroof frames, engine covers, cylinder head covers, inlet manifolds, windshield wipers, and exterior bodywork parts, such as wheel surrounds, door cladding, tailgates, spoilers, side components, roof modules, and engine hoods.

EXAMPLES

Preparation and Testing of Molding Compositions

Heat resistance of the specimens was determined to ISO 75 (HDT B) (load 0.45 MPa, temperature rise of 50 K per hour, on ISO specimens). Notched impact resistance of the products was determined to ISO 179 1eA.

Ductility of the products was characterized on the basis of the penetration test to ISO 6603. This also determines total deformation (St) alongside total energy absorption (Ws). The test was carried out on plaques of thickness 60*60*3 mm.

Surface resistivity was measured to IEC 60093 under standard conditions (23° C./50% r.h.), using electrodes composed of conductive silver paint (length=50 mm/separation=5 mm) and a counter-electrode. Prior to the measurements, the specimens were stored for 7 days under standard conditions (23° C./50% r.h.).

The viscosity number of the polyamides was measured to DIN 53727 on 0.5% strength by weight solutions in 96% by weight sulfuric acid.

Component A1

A semiaromatic nylon-616,T copolyamide (ratio 30:70) whose VN was 130 ml/g to ISO 307 was used as component A1.

Component B1

Tafiner®MH 7101: Ethylene-1-butene copolymer having 67.9% by weight of ethylene; 31.6% by weight of butene, and 0.5% by weight of maleic acid for functionalization.

Component B2

Fusabond® N NM493D from DuPont, ethylene-octene copolymer with maleic anhydride for functionalization, MFR 1.6 g/10" (D1238, 190° C./2.16 kg).

Component Bcomp

Ethylene-propylene rubber with 0.7% by weight of maleic acid/maleic anhydride for modification, characterized by an MFI value of 3 g per 10 min (measured with 2.16 kg at 230° C.).

Component C

Talc, e.g. 1T-Extra talc from Omya. $X_{10}=1.7$ μm. $X_{90}=10.8$ μm (measured by means of laser diffraction, the minerals having been homogenized in a suspension cell in a surfactant mixture of deionized water and 1% of CV K8 (marketed by: CV-Chemievertrieb, Hanover) (magnetic stirrer, 60 rpm).

Component D

General Operating Specification:

The polyhydric alcohol, diethyl carbonate, and 0.15% by weight of potassium carbonate as catalyst (amount based on amount of alcohol) were used as initial charge in accordance with the batch quantities of table 1 in a three-necked flask, equipped with stirrer, reflux condenser, and internal thermometer, and the mixture was heated to 140° C. and stirred at this temperature for 2 h. As reaction time proceeded, the temperature of this reaction mixture decreased, the reason for this being the onset of evaporative cooling by the ethanol liberated. The reflux condenser was then replaced by an inclined condenser and, based on the equivalent amount of catalyst, one equivalent of phosphoric acid was added, ethanol was removed by distillation, and the temperature of the reaction mixture was increased slowly to 160° C. The alcohol removed by distillation was collected in a cooled round-bottomed flask and weighed, and conversion was thus determined and compared in percentage terms with the full conversion theoretically possible (see table 1).

Dry nitrogen was then passed at 160° C. through the reaction mixture for a period of 1 h, in order to remove any residual amounts of monomers present. The reaction mixture was then cooled to room temperature.

Analysis of Inventive Polycarbonates:

The polycarbonates were analyzed by gel permeation chromatography using a refractometer as detector, The mobile phase used comprised dimethylacetamide, and the standard used for molecular-weight determination comprised polymethyl methacrylate (PMMA).

OH number was determined to DIN 53240, Part 2.

TABLE 1

Starting materials and final products

| Ex. No. | Alcohol | Molar ratio of alcohol to carbonate | Distillate, amount of alcohol, based on complete conversion mol % | Molar mass of product (g/mol) Mw Mn | OH number of product (mg KOH/g) to DIN 53240, Part 2 |
|---|---|---|---|---|---|
| 1 | TMP × 1.2 PO | 1:1 | 72 | 2300 1500 | 400 |

TMP = Trimethylolpropane
PO = Propylene oxide

The expression TMP×1.2 PO in the table describes a product which, per mole of trimethylolpropane, has been reacted with an average of 1.2 mol of propylene oxide, and analogously TMP×12 EO is a product which, per mole of trimethylolpropane, has been reacted with an average of 12 mol of ethylene oxide.

Component E1

Ensaco 250 conductive carbon black from Timcal, characterized by porosity of 170 kg/m³, determined to ASTM D1539-99.

Component F1
Naugard®445
4,4'-bis(alpha,alpha-dimethylbenzyl)diphenylamine
CAS Number: 10081-67-1

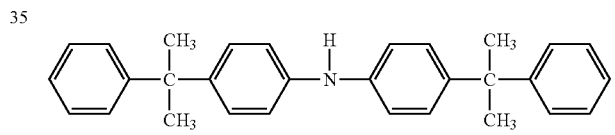

Component F2
Na hypophosphite
Component F3
Caesit®AV 40, Fa. Bärlocher: Ca stearate
Component F4
Pentaerythritol tetrastearate Production of Products The components were mixed in a twin-screw extruder at a melt temperature of from 300 to 330° C. The melt was passed through a waterbath and pelletized.

The test specimens were produced at a melt temperature of 330° C. and at a mold temperature of 100° C.

Table 2 lists the results of the tests and constitutions of the molding compositions.

TABLE 2

| | Molding composition | | | | | |
|---|---|---|---|---|---|---|
| | 2 | comp 3 | 4 | 5 | comp 6 | comp 7 |
| A1 | 72.7 | 69.4 | 69.1 | 69.1 | 72.5 | 69.1 |
| B1 | 15.8 | 16 | 15.8 | — | — | — |
| B2 | — | — | — | 15.8 | — | — |
| B/comp | — | — | — | — | 15.8 | 15.8 |
| C | 9.4 | 7 | 7 | 7 | 9.6 | 7 |
| D1 | 0.5 | — | 0.5 | 0.5 | 0.5 | 0.5 |

TABLE 2-continued

|  | Molding composition | | | | | |
|---|---|---|---|---|---|---|
|  | 2 | comp 3 | 4 | 5 | comp 6 | comp 7 |
| E1 | — | 6 | 6 | 6 | — | 6 |
| F1 | 0.78 | 0.78 | 0.78 | 0.78 | 0.78 | 0.78 |
| F2 | 0.02 | 0.02 | 0.02 | 0.02 | 0.02 | 0.02 |
| F3 | 0.3 | 0.3 | 0.3 | 0.3 | 0.3 | 0.3 |
| F4 | 0.5 | 0.5 | 0.5 | 0.5 | 0.5 | 0.5 |
| HDT B [° C.] | 172 | 158 | 169 | 171 | 167 | 159 |
| MVI [ml/10'] | 19.2 | 7.2 | 9.1 | 14.1 | 21.2 | 17.2 |
| ak, RT [KJ/m$^2$] | 13.8 | 11.1 | 11.3 | 10.7 | 9.7 | 6.9 |
| Surface resistivity [ohms] | >10$^{15}$ | 3 * 10$^{13}$ | 4 * 10$^{13}$ | 4 * 10$^{13}$ | >10$^{15}$ | 3 * 10$^{13}$ |
| Ws, −30° C. [Nm] | 89 | 58 | 88 | 81 | 54 | 23 |
| S$_r$, −30° C. [mm] | 14.8 | 13.7 | 16.1 | 16.4 | 11.7 | 7.8 |

The invention claimed is:

1. A thermoplastic molding composition comprising
   A) from 40 to 96% by weight of a semiaromatic polyamide,
   B) from 2 to 30% by weight of a copolymer composed of
      B$_1$) from 35 to 89.9% by weight of ethylene,
      B$_2$) from 10 to 60% by weight of 1-octene or 1-butene or a mixture of thereof, and
      B$_3$) from 0.05 to 5% by weight of functional monomers, where the functional monomers are carboxylic acid groups, carboxylic anhydride groups, carboxylic ester groups, carboxamide groups, carboximide groups, amino groups, hydroxyl groups, epoxy groups, urethane groups, or oxazoline groups, or a mixture of thereof,
   C) from 1 to 50% by weight of fibrous or particulate fillers, or a mixture of thereof,
   D) from 0.1 to 10% by weight of
      D$_1$) at least one highly branched or hyperbranched polycarbonate with an OH number of from 1 to 600 mg KOH/g of polycarbonate (to DIN 53240, part 2), or
      D$_2$) at least one highly branched or hyperbranched polyester of A$_x$B$_y$ type, where x is at least 1.1 and y is at least 2.1,
      or a mixture of these,
   E) from 0 to 15% by weight of an electrically conductive additive,
   F) from 0 to 30% by weight of further additives, where the total of the percentages by weight of components A) to F) is 100%.

2. The thermoplastic molding composition according to claim 1, wherein component E) is carbon nanotubes, carbon black, graphite, or a mixture of these.

3. The thermoplastic molding composition according to claim 1, wherein component D$_1$) has a number-average molar mass M$_n$ from 100 to 15,000 g/mol.

4. The thermoplastic molding composition according to claim 1, wherein component D$_1$) has a number-average molar mass M$_n$ from 100 to 15,000 g/mol and a glass transition temperature T$_g$ from −80° C. to 140° C. and a viscosity (mPas) at 23° C. (to DIN 53019) from 50 to 200,000.

5. The thermoplastic molding composition according to claim 1, wherein component D$_1$) has a glass transition temperature T$_g$ from −80° C. to 140° C.

6. The thermoplastic molding composition according to claim 1, wherein component D$_1$) has a viscosity (mPas) at 23° C. (to DIN 53019) from 50 to 200,000.

7. The thermoplastic molding composition according to claim 1, wherein component D$_2$) has a number-average molar mass M$_n$ from 300 to 30,000 g/mol.

8. The thermoplastic molding composition according to claim 1, wherein component D$_2$) has a glass transition temperature T$_g$ from −50° C. to 140° C.

9. The thermoplastic molding composition according to claim 1, wherein component D$_2$) has an OH number (to DIN 53240) from 0 to 600 mg KOH/g of polyester.

10. The thermoplastic molding composition according to claim 1, wherein component D$_2$) has a COOH number (to DIN 53240) from 0 to 600 mg KOH/g of polyester.

11. The thermoplastic molding composition according to claim 1, wherein component D$_2$) has a number-average molar mass M$_n$ from 300 to 30,000 g/mol, a glass transition temperature T$_g$ from −50° C. to 140° C. an OH number (to DIN 53240) from 0 to 600 mg KOH/g of polyester and a COOH number (to DIN 53240) from 0 to 600 mg KOH/g of polyester.

12. A process for the production of a fiber, foil or molding comprising utilizing the thermoplastic molding composition according to claim 1.

13. A fiber, a foil, or a molding which comprises the thermoplastic molding compositions according to claim 1.

14. A thermoplastic molding composition comprising
   A) from 40 to 96% by weight of a semiaromatic polyamide,
   B) from 2 to 30% by weight of a copolymer composed of
      B$_1$) from 35 to 89.9% by weight of ethylene,
      B$_2$) from 10 to 60% by weight of 1-octene or 1-butene or a mixture of thereof, and
      B$_3$) from 0.05 to 5% by weight of an ethylenically unsaturated mono- or dicarboxylic acid, or of a functional derivative of such an acid,
   C) from 1 to 50% by weight of fibrous or particulate fillers, or a mixture of thereof,
   D) from 0.1 to 10% by weight of
      D$_1$) at least one highly branched or hyperbranched polycarbonate with an OH number of from 1 to 600 mg KOH/g of polycarbonate (to DIN 53240, part 2), or
      D$_2$) at least one highly branched or hyperbranched polyester of A$_x$B$_y$ type, where x is at least 1.1 and y is at least 2.1,
      or a mixture of these,
   E) from 0 to 15% by weight of an electrically conductive additive,
   F) from 0 to 30% by weight of further additives,
   where the total of the percentages by weight of components A) to F) is 100%.

15. The thermoplastic molding composition according to claim 14, wherein component E) is carbon nanotubes, carbon black, graphite, or a mixture of these.

16. The thermoplastic molding composition according to claim 15, wherein component D$_1$) has a number-average molar mass M$_n$ from 100 to 15,000 g/mol and a glass transition temperature T$_g$ from −80° C. to 140° C. and a viscosity (mPas) at 23° C. (to DIN 53019) from 50 to 200,000.

17. The thermoplastic molding composition according to claim 16, wherein component D$_2$) has a number-average molar mass M$_n$ from 300 to 30,000 g/mol, a glass transition temperature T$_g$ from −50° C. to 140° C. an OH number (to DIN 53240) from 0 to 600 mg KOH/g of polyester and a COOH number (to DIN 53240) from 0 to 600 mg KOH/g of polyester.

18. The thermoplastic molding composition according to claim 15, wherein component D$_2$) has a number-average molar mass M$_n$ from 300 to 30,000 g/mol, a glass transition temperature T$_g$ from −50° C. to 140° C. an OH number (to DIN 53240) from 0 to 600 mg KOH/g of polyester and a COOH number (to DIN 53240) from 0 to 600 mg KOH/g of polyester.

* * * * *